US009188082B2

(12) United States Patent
Colin et al.

(10) Patent No.: US 9,188,082 B2
(45) Date of Patent: Nov. 17, 2015

(54) METHOD FOR MONITORING THE LOCKING MEANS OF AN ELECTRICAL THRUST REVERSAL SYSTEM FOR A TURBINE ENGINE

(75) Inventors: Antoine Olivier François Colin, Brunoy (FR); Nicolas Marie Pierre Gueit, Montrouge (FR); Catherine Dorothée Josette Ibanez Garcia, Bourg la Reine (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 14/237,101

(22) PCT Filed: Jul. 31, 2012

(86) PCT No.: PCT/FR2012/051805
§ 371 (c)(1),
(2), (4) Date: Feb. 4, 2014

(87) PCT Pub. No.: WO2013/021120
PCT Pub. Date: Feb. 14, 2013

(65) Prior Publication Data
US 2014/0172201 A1 Jun. 19, 2014

(30) Foreign Application Priority Data

Aug. 5, 2011 (FR) ...................................... 11 57201

(51) Int. Cl.
*F02K 1/76* (2006.01)
(52) U.S. Cl.
CPC ...................................... *F02K 1/766* (2013.01)

(58) Field of Classification Search
CPC .................................. F02K 1/766; F02K 1/763
USPC .............................................. 701/3; 60/226.2
See application file for complete search history.

(56) References Cited

U.S. PATENT DOCUMENTS

2004/0139725 A1* 7/2004 Colotte et al. ............... 60/226.2
2011/0022345 A1* 1/2011 Maalioune .................... 702/115

FOREIGN PATENT DOCUMENTS

EP       0 843 089     5/1998
FR       2 920 201     2/2009
FR       2 928 681     9/2009

OTHER PUBLICATIONS

International Search Report as issued for International Application No. PCT/FR2012/051805, dated Oct. 9, 2012.

* cited by examiner

*Primary Examiner* — James Trammell
*Assistant Examiner* — Brian P Sweeney
(74) *Attorney, Agent, or Firm* — Pillsbury Winthrop Shaw Pittman LLP

(57) ABSTRACT

A method for monitoring at least one locking device of an electrical thrust reversal system for a turbine engine, the method being carried out by a computer prior to the take-off of the turbine engine, the method including sending a command for opening the locking devices; verifying the opening of the locking devices; sending a command for closing the locking devices; and verifying the closing of the locking devices.

11 Claims, 2 Drawing Sheets

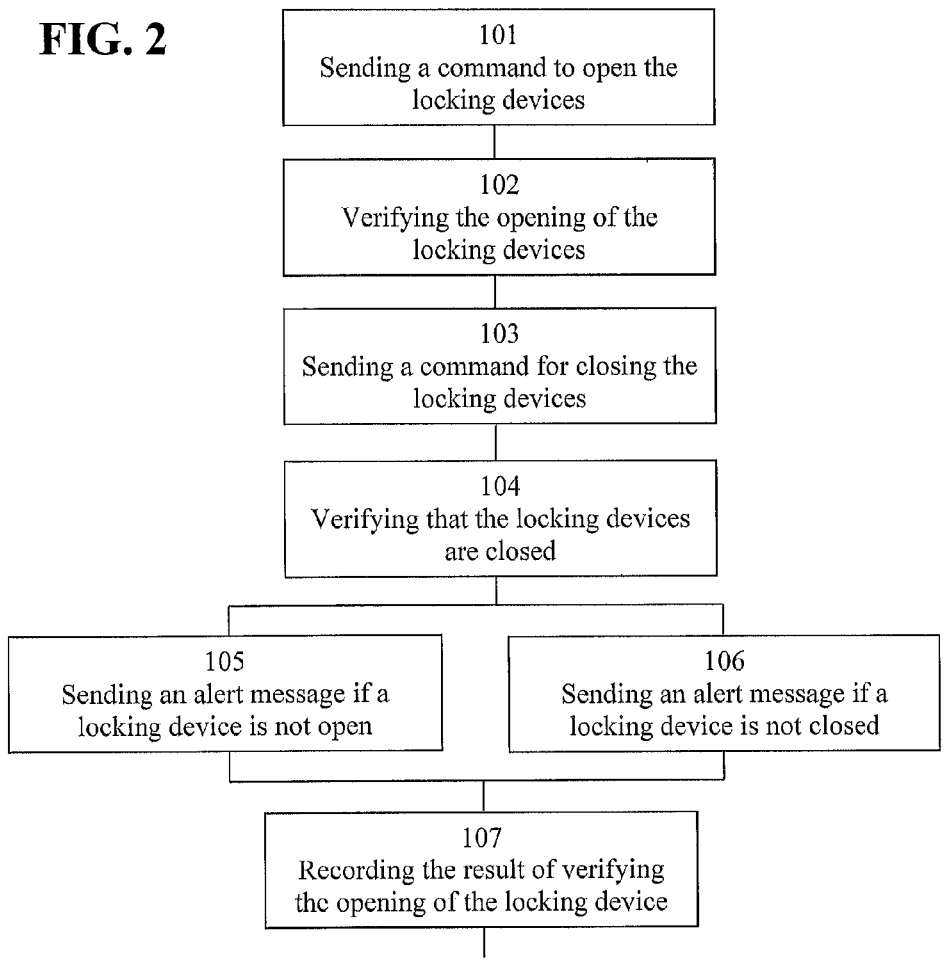

METHOD FOR MONITORING THE LOCKING MEANS OF AN ELECTRICAL THRUST REVERSAL SYSTEM FOR A TURBINE ENGINE

CROSS REFERENCE TO RELATED APPLICATIONS

This application is the U.S. National Stage of PCT/FR2012/051805, filed Jul. 31, 2012, which in turn claims priority to French Patent Application No. 1157201, filed Aug. 5, 2011, the entire contents of all applications are incorporated herein by reference in their entireties.

TECHNICAL FIELD

The present invention relates to a method for monitoring the locking means of an electrical thrust reversal system for a turbine engine. The present invention also relates to a computer able to implement such a method, as well as a turbine engine comprising such a computer.

STATE OF THE PRIOR ART

Turbine engines are conventionally equipped with thrust reversers which enable the thrust exerted by the turbine engine to be oriented forwards in order to brake the airplane, which makes it possible in particular to reduce braking distances during landing.

In flight, the thrust reverser must be locked. On the other hand, during landing, the thrust reverser must be able to be deployed. In order to avoid any risk of deployment of the thrust reverser in flight, it is generally locked in closed position by three independent locking means which are normally in closed position, and all three of which have to be placed in the open position so that the thrust reverser can be deployed. In the case of an electrical thrust reverser, the actuating system of the reverser is formed of an electric motor, controlled and managed by a dedicated control unit.

For safety reasons, in order to unlock the locking means which prevents the deployment of the thrust reverser, at least two independent command lines are used.

In order for the thrust reverser to be deployed, it is imperative that these three independent command lines are activated. The activation of these three command lines then causes the opening of the three locking means, and it is if and only if said three locking means are open that the thrust reverser can be deployed.

Thus, if one of the locking means is not functioning, the thrust reverser is not going to open and the pilot is only going to discover that the thrust reverser is not functioning at the moment when he asks the thrust reverser to open, in other words generally while landing, which is a critical moment for the pilot. Moreover, in the case where one of the electrical reversers deploys and not the other, this can lead to thrust dissymmetries during landing and impact the manoeuvrability of the aircraft.

DESCRIPTION OF THE INVENTION

The invention aims to overcome the drawbacks of the prior art by proposing a method for monitoring the locking means of an electrical thrust reversal system which enables the pilot to ensure that his thrust reverser will indeed be able to open if required.

To do so, according to a first aspect of the invention, a method for monitoring at least one means of locking an electrical thrust reversal system for a turbine engine in an airplane is proposed, the method being carried out by a computer prior to the take-off of the airplane, the method comprising the following steps:
  Sending a command for opening the locking means;
  Verifying the opening of the locking means;
  Sending a command for closing the locking means.

This method is implemented when the airplane is not flying. This method may for example be set in motion automatically during the start-up of the computers or then it may be set in motion manually, particularly at the initiative of the pilot, for example during the phase during which the passengers are boarding the airplane.

This method of testing each of the locking means making it possible to verify that the locking means can indeed open takes place when the airplane is not flying, for safety reasons, and throughout a phase during which the pilot does not have need of the thrust reverser and when the turbine engine is not running, which prevents any dangerous consequences if any element of the thrust reverser has broken down and may lead to movements of the reverser in an undesired manner.

The method thus enables the pilot to be able to test very simply if the thrust reverser will be able to be deployed or not. The invention has the major advantage of enabling the pilot to know part of the state of the electrical thrust reversal system prior to using it. Hidden breakdowns of the locking means of the reverser are detected prior to the operational use of the reverser. The invention thus makes it possible to reduce the risks of an incident during the landing phase.

The method according to the invention may also have one or more of the characteristics below taken individually or according to any technically possible combinations thereof.

Advantageously, the method according to the invention further comprises a step of verifying the closing of the locking means following the step of sending the command for closing the locking means, which allows the pilot to ensure that the thrust reverser is indeed closed before he takes off.

The verifications of the closing and the opening of the locking means are preferably carried out by the computer by means of proximity sensors.

Advantageously, the electrical reversal system comprises several means of locking the thrust reverser. In this case, according to different embodiments:
  The steps of sending a command for opening the locking means, of verifying the opening of said locking means, of sending a command for closing may then take place successively for the first locking means, then for the second locking means . . . up to the final locking means, or then;
  The step of sending the command for opening of all the locking means takes place, then the step of verifying the opening of all the locking means takes place, then the step of closing of all the locks takes place.

According to a preferential embodiment, the electrical thrust reversal system comprises a thrust reverser and a first, a second and a third locking means, the locking means being able to be placed in a closed position in which the deployment of the thrust reverser is not possible, and in an open position in which the deployment of the thrust reverser is possible, the opening and the closing of the first and the second locking means being commanded by a control unit, the control unit and the third locking means being supplied by an electrical network of the airplane, the step of sending the command for opening the locking means comprising the following sub-steps:
  Sending to the electrical network of the airplane an order for powering up the control unit and the third lock;

Sending to the control unit an order for opening the first and the second locking means.

Thus, the method consists in opening the locking means so as to test them by following the protocol which is normally used to deploy the thrust reverser, and does so on the ground, while the thrust reverser is not used and while the turbine engine is stopped.

This method is preferably implemented by a computer, which is preferably the FADEC (Full Authority Digital Engine Control).

Advantageously, the step of sending the command for closing the locking means comprises the following sub-steps:
Sending to the control unit an order for closing the first and the second locking means;
Sending to the electrical network of the airplane an order to stop the powering up of the third locking means;
Sending to the electrical network of the airplane an order to stop the powering up of the control unit.

The step of sending to the electrical network of the airplane an order to stop the powering up is preferably a command step for opening a contactor to stop the powering up.

According to different embodiments:
the method may be set in motion automatically, particularly by the computer, or instead
it may be set in motion manually, particularly by the pilot.

In both cases, the method is preferably set in motion at each start-up of the computer, which makes it possible to optimise maintenance actions in so far as the state of the locking means of the thrust reverser is tested at each start-up of the FADEC. Thus, the slightest problem is detected as soon as it occurs, which enables optimal interventions by the maintenance teams.

Advantageously, the method further comprises a step of sending an alert message if at least one of the locking means is not open, in order to alert the pilot that he will not be able in all likelihood to count on the thrust reverser during landing.

Advantageously, the method further comprises a step of recording the result of the step of verifying the opening of the locking means, which makes it possible to memorise potential breakdowns of the locking means, in order to optimise maintenance operations.

A second aspect of the invention also relates to a computer, and particularly the FADEC, able to implement the method according to the first aspect of the invention.

A third aspect of the invention also relates to a turbine engine comprising a computer according to the second aspect of the invention.

BRIEF DESCRIPTION OF THE DRAWINGS

Other characteristics and advantages of the invention will become clearer on reading the detailed description that follows, with reference to the appended figures, which illustrate:

FIG. 2, a schematic representation of the steps of a method according to an embodiment of the invention.

For greater clarity, identical or similar elements are marked by identical reference signs in all of the figures.

DETAILED DESCRIPTION OF AT LEAST ONE EMBODIMENT

Figure 1:
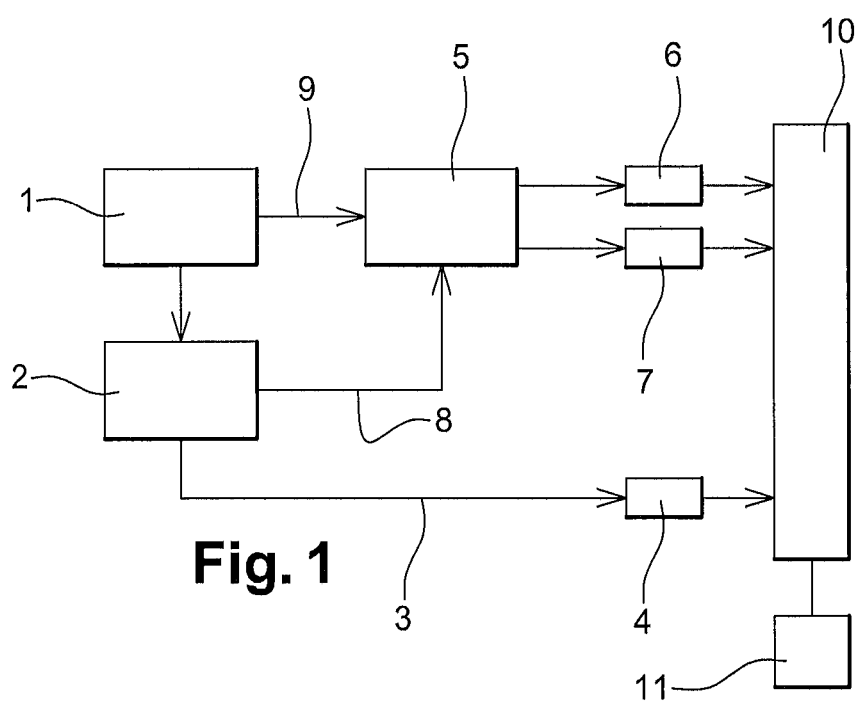
FIG. 1, a schematic representation of an electrical thrust reversal system to which the method according to the invention applies.

FIG. 1 represents an electrical thrust reversal system to which the method according to the invention applies. This electrical thrust reversal system is preferably controlled by a computer 1 which is preferably the FADEC.

The electrical thrust reversal system comprises a thrust reverser 10 that can be deployed so as to orient towards the front of the turbine engine part of the thrust exerted by the engine in order to brake the aircraft.

The electrical thrust reversal system also comprises three locking means 4, 6, 7 which prevent the deployment of the thrust reverser 10 when they are in closed position and which authorise the deployment of the thrust reverser 10 when they are all three in the open position.

The electrical thrust reversal system also comprises a control unit 5, which is itself commanded by the computer 1, and which is supplied with energy by an electrical network of the airplane 2. The control unit 5 makes it possible to command the first and the second locking means 6, 7 in opening and in closing. In order that the control unit can open the first and the second locking means 6, 7, it has to be able to be supplied by the electrical network of the airplane 2. The control unit 5 is generally supplied with 115 V three phase alternating current.

The third locking means 4 for its part is directly connected to the electrical network of the airplane 2. The third locking means 4 open when it is supplied with voltage by the electrical network of the airplane 2. The third locking means 4 is generally supplied with 115 V single phase alternating current.

The electrical thrust reversal system also comprises an electric motor 11 making it possible to deploy the thrust reverser 10 once the locking means are open.

The method according to the invention is preferably set in motion prior to each take-off of the airplane by the computer 1. The method according to the invention may for example be set in motion automatically at each start-up of the computer 1.

The method according to the invention firstly comprises a step of verifying that the conditions for carrying out the test are all met. The method may thus for example comprise a step of verifying that the airplane is indeed on the ground.

The method then comprises a step 101 of sending a command for opening the locking means. To do so, the computer 1 firstly asks the electrical network of the airplane 2 to supply the control unit 5. In this example, the control unit 5 is supplied with 115 V three phase alternating current. The computer 1 then asks the electrical network of the airplane 5 to supply the third locking means 4 so as to unlock it. The computer then asks the control unit 5 to unlock the first and the second locking means 6, 7.

The method then comprises a step 102 of verifying the opening of the locking means. This step is preferably performed by the computer 1 which controls, for example by means of proximity sensors to which it is connected, that the locking means 4, 6, 7 are indeed open.

The method then comprises a step 103 of sending a command for closing the locking means. To do so, the computer 1 preferably orders the control unit 5 to lock the first and the second locking means 6, 7. The computer 1 then asks the electrical network of the airplane 2 to stop the supply of the third locking means 4 so as to lock it. Finally, the computer asks the electrical network of the airplane to stop the power supply of the control unit.

The method comprises a step 104 during which the computer verifies, via proximity sensors, that the locking means 4, 6, and 7 are indeed closed.

The method comprises a step 105 of sending an alert message if at least one of the locking means is not open. The computer then sends preferably the alert message to the flight deck of the airplane, for example in the form of a light signal, for the attention of the pilot.

The method comprises a step 106 of sending an alert message if at least one of the locking means is not closed. The take-off of the airplane may then be prevented.

Thus, the method according to the invention makes it possible to inform the pilot easily and without requiring a high power for computing the correct functioning or the non-functioning of the locking means enabling the deployment of the thrust reverser. In the event of failure of the locking means, the pilot can then prepare to land without using the thrust reverser.

The method comprises a step 107 of recording the result of the step of verifying the opening of the locking means and potentially of the step of closing, which makes it possible to know exactly from what moment the locking means have suffered breakdown. Breakdowns are preferably recorded in the centralised maintenance system of the airplane so as to facilitate the work of the maintenance personnel.

Naturally, the invention is not limited to the embodiments described with reference to the figures and variants could be envisaged without going beyond the scope of the invention.

The invention claimed is:

1. A computer implemented method for monitoring at least one locking device of an electrical thrust reversal system for a turbine engine in an airplane, said electrical thrust reversal system comprising a thrust reverser and a first, a second and a third locking device, the locking devices being able to be placed in a closed position in which the deployment of the thrust reverser is not possible, and in an open position in which the deployment of the thrust reverser is possible, the opening and the closing of the first and the second locking device being commanded by a control unit, the control unit and the third locking device being supplied by an electrical network of the airplane, the method being carried out by a computer prior to the take-off of the airplane, the method comprising:
    verifying, by the computer, that the airplane is on the ground and that the turbine engine is stopped;
    after said verifying, sending, by the computer, a command for opening the locking devices, the sending comprising:
        sending, by the computer, to the electrical network of the airplane an order for powering up the control unit and the third locking device;
        sending, by the computer, to the control unit an order for opening the first and the second locking device;
    verifying, by the computer, the opening of said locking devices;
    sending, by the computer, a command for closing the locking devices.

2. The monitoring method according to claim 1, further comprising verifying, by the computer, the closing of the locking devices following the sending of the command for closing the locking devices.

3. The monitoring method according to claim 2, wherein sending the command for closing the locking devices comprises:
    sending, by the computer, to the control unit an order for closing the first and the second locking device;
    sending, by the computer, to the electrical network of the airplane an order to stop the powering up of the third locking device;
    sending, by the computer, to the electrical network of the airplane an order to stop the powering up of the control unit.

4. The monitoring method according to claim 1, wherein said method is set in motion automatically on turning on the computer.

5. The monitoring method according to claim 1, wherein said method is set in motion manually.

6. The monitoring method according to claim 1, further comprising sending, by the computer, an alert message to a flight deck of the airplane if at least one of the locking devices is not open.

7. The monitoring method according to claim 1, further comprising recording, in a maintenance system of the airplane, the result of the verifying of the opening of the locking devices.

8. The monitoring method according to claim 1, wherein the computer is a Full Authority Digital Engine Control (FADEC) computer.

9. A computer comprising components for implementing a method for monitoring at least one locking device of an electrical thrust reversal system for a turbine engine in an airplane, said electrical thrust reversal system comprising a thrust reverser and a first, a second and a third locking device, the locking devices being able to be placed in a closed position in which the deployment of the thrust reverser is not possible, and in an open position in which the deployment of the thrust reverser is possible, the opening and the closing of the first and the second locking device being commanded by a control unit, the control unit and the third locking device being supplied by an electrical network of the airplane, the method being carried out by the computer prior to the take-off of the airplane, the method comprising:
    verifying that the airplane is on the ground and that the turbine engine is stopped;
    after said verifying, sending, by the computer, a command for opening the locking devices, the sending comprising:
        sending, by the computer, to the electrical network of the airplane an order for powering up the control unit and the third locking device;
        sending, by the computer, to the control unit an order for opening the first and the second locking device;
    verifying the opening of said locking devices;
    sending, by the computer, a command for closing the locking devices.

10. The computer according to claim 9, wherein the computer is a Full Authority Digital Engine Control (FADEC) computer.

11. A turbine engine comprising a computer comprising components for implementing a for monitoring at least one locking device of an electrical thrust reversal system for a turbine engine in an airplane, said electrical thrust reversal system comprising a thrust reverser and a first, a second and a third locking device, the locking devices being able to be placed in a closed position in which the deployment of the thrust reverser is not possible, and in an open position in which the deployment of the thrust reverser is possible, the opening and the closing of the first and the second locking device being commanded by a control unit, the control unit and the third locking device being supplied by an electrical network of the airplane, the method being carried out by the computer prior to the take-off of the airplane, the method comprising:
    verifying that the airplane is on the ground and that the turbine engine is stopped;
    sending, by the computer, a command for opening the locking devices, the sending comprising:
        sending, by the computer, to the electrical network of the airplane an order for powering up the control unit and the third locking device;
        sending, by the computer, to the control unit an order for opening the first and the second locking device;
    verifying the opening of said locking devices;

sending, by the computer, a command for closing the locking devices.

\* \* \* \* \*